(12) United States Patent
Allen et al.

(10) Patent No.: US 10,081,223 B2
(45) Date of Patent: Sep. 25, 2018

(54) VEHICLE TOW HOOK ADAPTER

(71) Applicant: Motor City Aftermarket, Livonia, MI (US)

(72) Inventors: Adam Allen, Plymouth, MI (US); Justin Allen, Plymouth, MI (US)

(73) Assignee: Motor City Aftermarket, Livonia, MI (US)

( * ) Notice: Subject to any disclaimer, the term of this patent is extended or adjusted under 35 U.S.C. 154(b) by 0 days.

(21) Appl. No.: 15/699,589

(22) Filed: Sep. 8, 2017

(65) Prior Publication Data

US 2018/0065432 A1     Mar. 8, 2018

Related U.S. Application Data

(60) Provisional application No. 62/384,946, filed on Sep. 8, 2016.

(51) Int. Cl.
*F16M 11/20* (2006.01)
*B60D 1/58* (2006.01)
*B60D 1/56* (2006.01)
*B60R 19/48* (2006.01)

(52) U.S. Cl.
CPC .............. *B60D 1/58* (2013.01); *B60D 1/565* (2013.01); *B60R 19/48* (2013.01)

(58) Field of Classification Search
CPC ........... B60D 1/58; B60D 19/48; B60D 1/565
See application file for complete search history.

(56) References Cited

U.S. PATENT DOCUMENTS

| 7,222,873 B2 | 5/2007 | Rodgers | |
|---|---|---|---|
| 9,016,643 B2 | 4/2015 | Sterling | |
| 2005/0051994 A1* | 3/2005 | Rodgers | B60D 1/00 280/416.1 |
| 2014/0346299 A1* | 11/2014 | Sterling | B60D 1/488 248/228.1 |

* cited by examiner

*Primary Examiner* — Amy J. Sterling
(74) *Attorney, Agent, or Firm* — Reising Ethington, P.C.

(57) ABSTRACT

An adapter block for mounting accessory equipment to a tow hook. The adapter block comprises a top face and a bottom face disposed opposite the top face and lateral sides. The front side of the adapter block having uniform surfaces extending between the top and bottom faces, the lateral sides having a first thickness, wherein the bottom face includes a recess extending toward the top face, and the recess having a second thickness less than the first thickness and being contoured to receive at least a portion of the tow hook in a mating engagement. The first and second through-passages extend between the bottom face, and the top face are configured to receive a fastener that couples the tow hook within the recess.

15 Claims, 4 Drawing Sheets

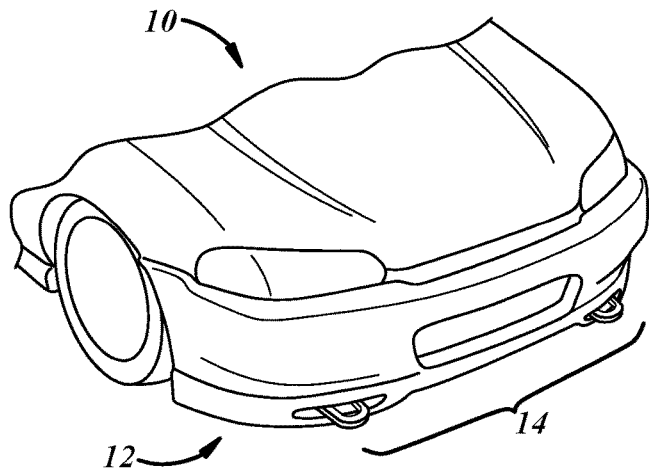
FIG. 1
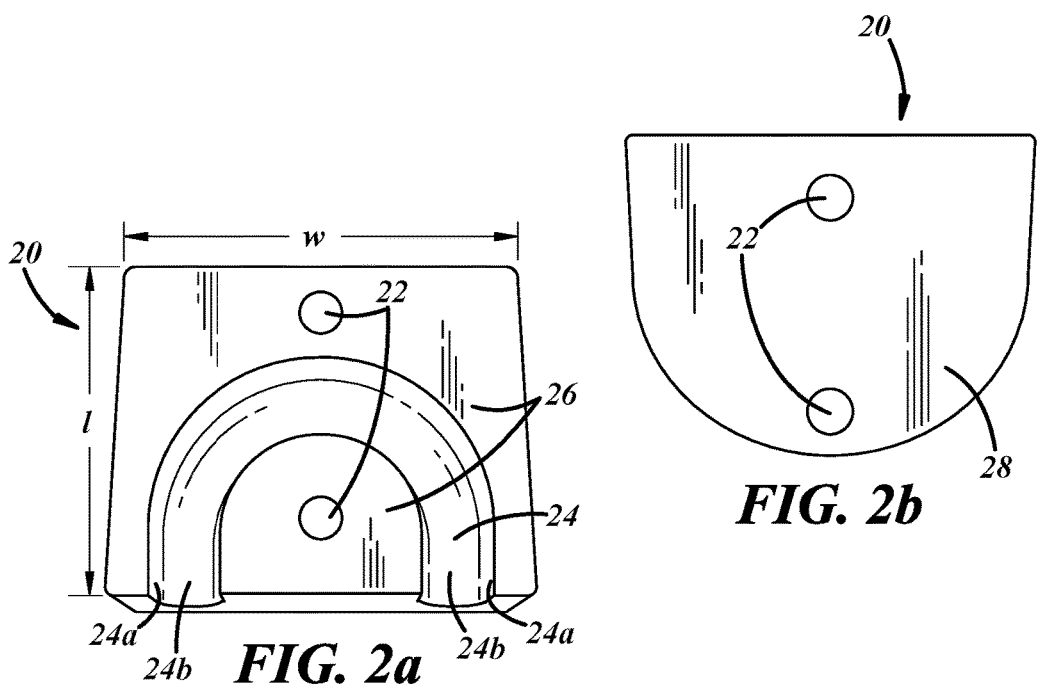
FIG. 2a
FIG. 2b
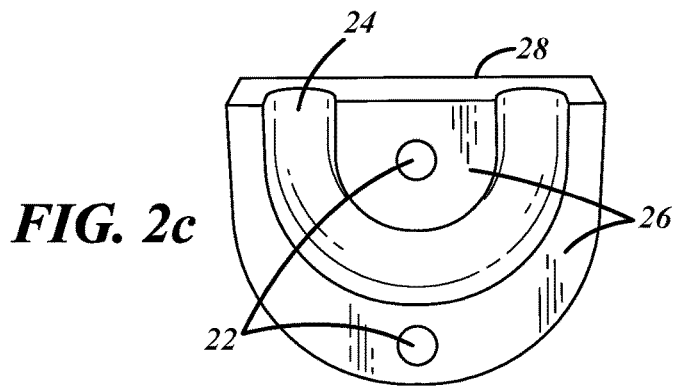
FIG. 2c

VEHICLE TOW HOOK ADAPTER

FIELD

The present invention generally relates to mounting assemblies for attaching accessory equipment to vehicle bumpers and, more particularly, to an adapter for attaching a vehicle accessory such as a brush guard to a tow hook.

BACKGROUND

Structural members behind vehicle bumpers are often used as points of attachment for vehicle accessory equipment. In four wheel drive vehicles, including pickup trucks and sport utility vehicles, these points of attachment are often tow hooks that extend through, or just below, the front bumper of the vehicle. In some cases, a pair of rear tow hooks is also provided.

For vehicles that go "off-road" into rough terrain, popular vehicle accessories include grille, brush, and/or bumper guards that mount to the front of the vehicle to protect the vehicle from scratches, nicks, and dents that can result from contact with brush and other obstructions. Grille or brush guards can also protect the engine compartment from road debris that can pass through the vehicle grille and damage components, such as the transmission oil cooler if debris passes through the vehicle's air intake opening.

Attaching accessory equipment to tow hooks often requires alteration of the bumper or surrounding fascia components, or the use of complicated assemblies having a cost-prohibitive quantity of components.

SUMMARY

According to a first embodiment, there is provided an adapter block for mounting accessory equipment to a tow hook. The adapter block comprises a top face and a bottom face disposed opposite the top face and lateral sides. The front side of the adapter block having uniform surfaces extending between the top and bottom faces, the lateral sides having a first thickness, wherein the bottom face includes a recess extending toward the top face, and the recess having a second thickness less than the first thickness and being contoured to receive at least a portion of the tow hook in a mating engagement. The first and second through-passages extend between the bottom face and the top face and are configured to receive a fastener that couples the tow hook within the recess.

According to another embodiment, there is provided an automobile brush guard to tow hook assembly. The assembly may include a tow hook having straight portions and a curved portion between the straight portions, an adapter block with a first face and a second face disposed from the first face, a rear face and lateral sides extending between the first and second faces, a pocket in the first face having a contour corresponding to the curved and straight portions of the tow hook, wherein the pocket establishes an inboard boss partially establishing the rear face and extending within the curved and straight portions of the tow hook and an outboard boss partially establishing the lateral sides and rear face, a first through-passage extending between the first and second faces and through the inboard boss, a second through-passage extending between the first and second faces and through the inboard boss, and a fastener to fasten the adapter block to the tow hook.

According to another embodiment, there is provided an adapter for mounting accessory equipment to a tow hook. The adapter comprises a top face and bottom face disposed opposite the top face, lateral sides having straight portions extending between the top and bottom faces, a curved front side extending between the lateral sides, the lateral sides and the curved front side having a first thickness, wherein the top face includes a recess extending toward the top face, the recess having a second thickness less than the first thickness and being contoured to receive at least a portion of the tow hook in a mating engagement, and wherein the first and the second through-passages extend between the bottom face and the top face and are configured to receive a fastener that couples the tow hook within the recess.

DRAWINGS

Preferred illustrative embodiments will hereinafter be described in conjunction with the appended drawings, wherein like designations denote like elements, and wherein:

FIG. 1 illustrates a vehicle with a bumper assembly that includes illustrative tow hooks;

FIGS. 2A-2C depict an illustrative accessory adapter block according to an embodiment of the invention;

DESCRIPTION

Figure 3:
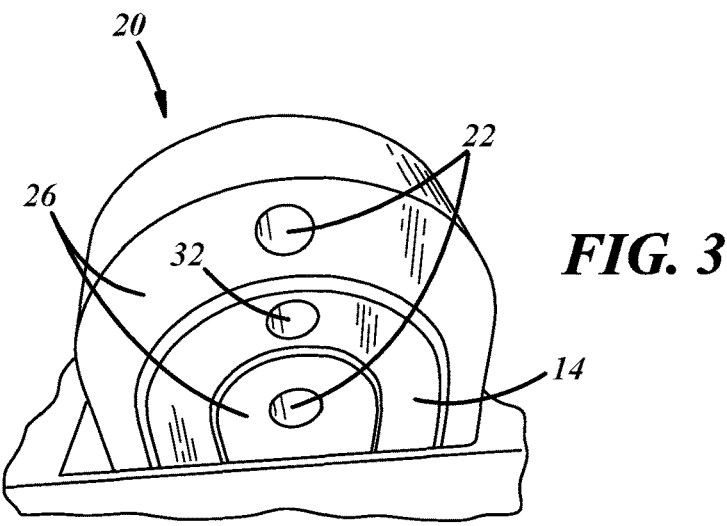
FIG. 3 depicts a bottom view of a U-shaped tow hook assembled within the U-shaped accessory adapter shown in FIGS. 2A-2C.
Figure 4:
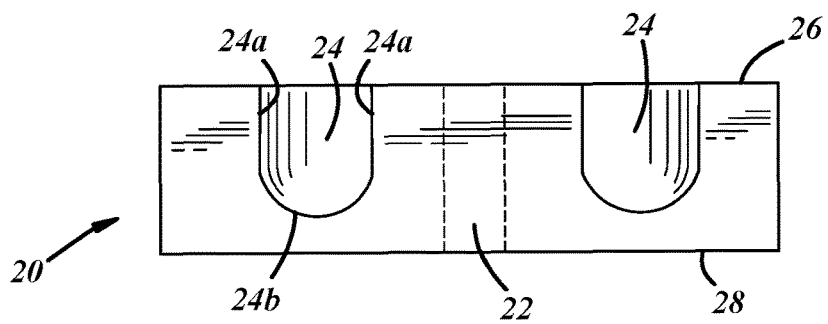
FIG. 4 depicts an end view of the illustrative accessory adapter block shown in FIGS. 2A-2C.

Described below is a mounting assembly for attaching accessory equipment to vehicle bumpers and, more particularly, to an accessory adapter for attaching a vehicle accessory such as a brush guard to a tow hook. The disclosed adapter can be used to mount accessory equipment such as, for example, a bumper guard, light guard, or grille guard to the front of the vehicle. As understood by those skilled in the art, the adapter may also be applied to accessory equipment suitable for the rear of the vehicle. FIG. 1 illustrates a vehicle 10 with a front bumper 12 having tow hooks 14 extending through apertures in a lower portion of the bumper. In the embodiment shown in FIG. 1, the tow hooks 14 are configured as U-shaped closed hooks, but may also be J-shaped open hooks or any other suitable shape for a tow hook. One of ordinary skill in the art appreciates that the tow hooks 14 may be fixed or detachable from the bumper 12 and would recognize that the tow hooks are exaggerated for purposes of illustration. In addition, while FIG. 1 illustrates two tow hooks 14, other applications may use or require the use of only one tow hook 14. Furthermore, while the one or more tow hooks 14 are shown in FIG. 1 extending from the bumper 12 horizontally with respect to a ground plane, one of ordinary skill in the art appreciates that the tow hooks 14 may also be oriented vertically with respect the horizontal ground plane.

FIGS. 2A-2C illustrate views of two different illustrative accessory adapter blocks 20 according to multiple embodiments. The accessory adapter block 20 is generally formed from a unitary solid block of material, for example, a metal, for instance aluminum, but may also be constructed using laminated layers of metal. The accessory adapter block 20 has a length, width, and depth (thickness) that may vary to accommodate the size, shape, and weight of the accessory equipment as well as the design and configuration of the tow hook(s). The minimum/maximum envelope for the dimensions of the accessory adapter block 20 may be defined as a ratio relative to the individual dimensions. For example, in one non-limiting embodiment, the length-to-width (L:W) ratios may range from 1:1 to 1.3:1, including all ranges, subranges, and values therebetween; the length-to-thickness (L:T) ratios may range from 3.5:1 to 4.5:1, including all ranges, subranges, and values therebetween; and the width-to-thickness (W:T) ratios may range from 3:1 to 4:1, including all ranges, subranges, and values therebetween.

The accessory adapter block 20 is constructed from a unitary block of metal having a top face 28 and a bottom face 26, wherein the top face 28 is disposed opposite the bottom face 26 and has a generally uniform surface. In one embodiment, illustrated in FIG. 2A, the accessory adapter block 20 includes lateral sides of equal length having uniform surfaces that extend between the top and bottom faces. Front and rear end or sides of the accessory adapter block 20 are of equal length and also extend between the top face 28 and bottom face 26 and adjacent the lateral sides. In on embodiment, the top face 28 has a uniform surface substantially perpendicular to the uniform surfaces of the lateral sides and the front side. The depth of the lateral sides and the front side define the overall thickness of the accessory adapter block 20. In FIGS. 2B-2C, the periphery of the accessory adapter block 20 is curved to form a U-shaped accessory adapter that follows the contour of the tow hook 14. FIG. 2C illustrates the bottom face of the U-shaped accessory adapter shown in FIG. 2B.

The bottom face 26 of the accessory adapter block 20 includes a pocket or recess that is contoured according to the shape and size of the tow hook 14 such that the pocket or recess 24 is configured to receive at least a portion of the tow hook 14. The recess 24 extends from the bottom face 26 toward the top face 28 of the accessory adapter block 20 having a thickness that is less than the overall thickness of the accessory adapter block 20. In one embodiment, the recess 24 is defined by two surfaces 24a with a base surface 24b therebetween. The two surfaces 24a may be substantially perpendicular to bottom face 26 of the accessory adapter block 20. The base surface 24b may be substantially perpendicular to the two surfaces 24a, may be curved, or may be shaped to conform to the shape of the tow hook. Additionally, there may be fillets or chamfers where each of the two surfaces 24a and the base surface 24b meet. The recess 24 fits around the tow hook forming a mating engagement inside and outside of the tow hook that secures the tow hook 14 into the accessory adapter block 20 minimizing or preventing movement between the accessory adapter block 20 and the tow hook 14 in a lateral direction. In one embodiment, the recess 24 is machined, formed, and/or cast into the metal block with suitable tolerances according to the size and shape of the tow hook 14. FIG. 3 illustrates a bottom-side view of a U-shaped tow hook assembled within the U-shaped accessory adapter block 20 shown in FIGS. 2B-2C.

The recess 24 illustrated in the FIGS. 2A-2C is provided to conform to a U-shaped tow hook 14 having generally straight leg portions connected by a curved portion. The straight portions of the recess form openings in one end of the accessory adapter block, which for purposes of explanation is herein referred to as the rear end, face, or side. The recess in the bottom face and extending through the rear face from an inboard and outboard boss, wherein the inboard boss partially establishes the rear face and extends within the curved and straight portions of the U-shaped tow hook and the outboard boss partially establishes the lateral sides and the rear face.

Figure 5:
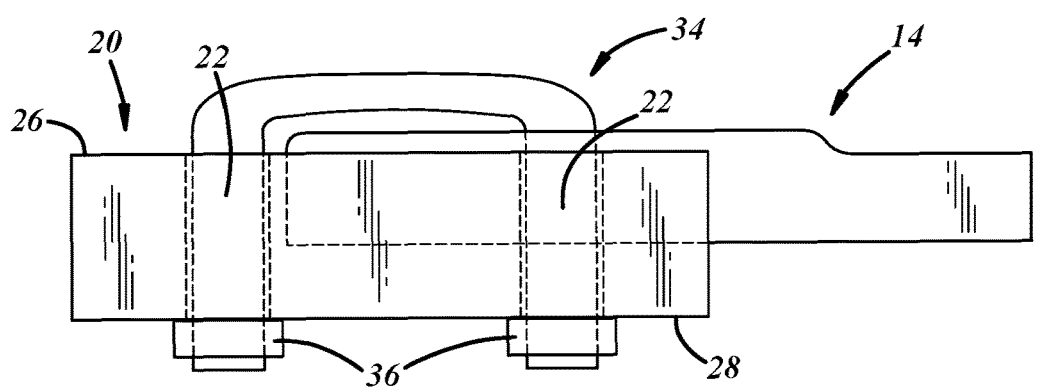
FIG. 5 depicts a side view of the illustrative accessory adapter block shown in FIGS. 2A-2C coupled to a tow hook.

The accessory adapter block 20 further includes first and second through-passages 22 extending between the top face and the bottom face. The through-passages 22 are configured to receive a fastener 34 that couples the tow hook 14 within the recess 24. In one embodiment, as shown in FIG. 5, the fastener may include a U-bolt 34 having legs extending through the first and second through-passages 22, and bolt fasteners 34 coupled to the U-bolt 34 legs. One of ordinary skill in the art appreciates that while FIG. 5 illustrates the accessory adapter block 20 coupled to topside of the tow hook 14, the accessory adapter block 20 is interchangeable and may also be coupled to the bottom side of the tow hook. Similarly, the fastener 34 may be received from a topside of the assembly as shown in FIG. 5, or from the underside of the assembly (not shown).

Figure 6:
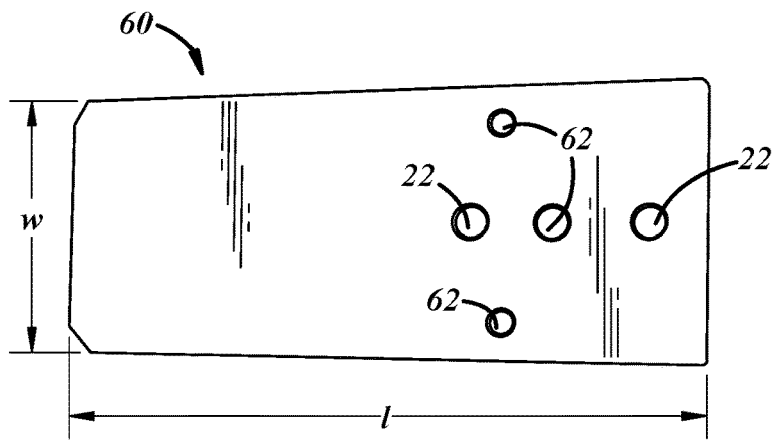
FIGS. 6 and 7 depict views of an illustrative adapter plate according to an embodiment of the invention.
Figure 7:
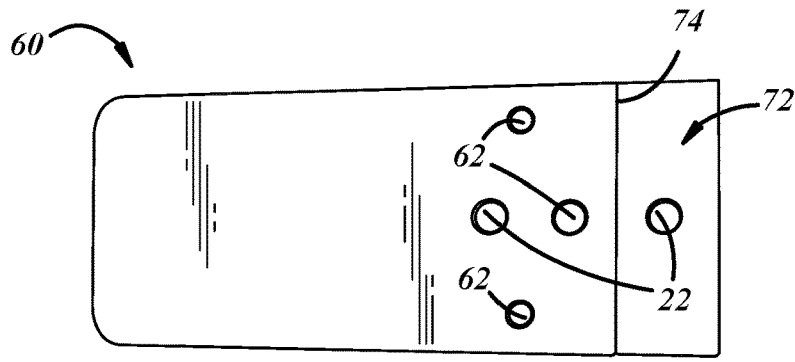
Figure 8:
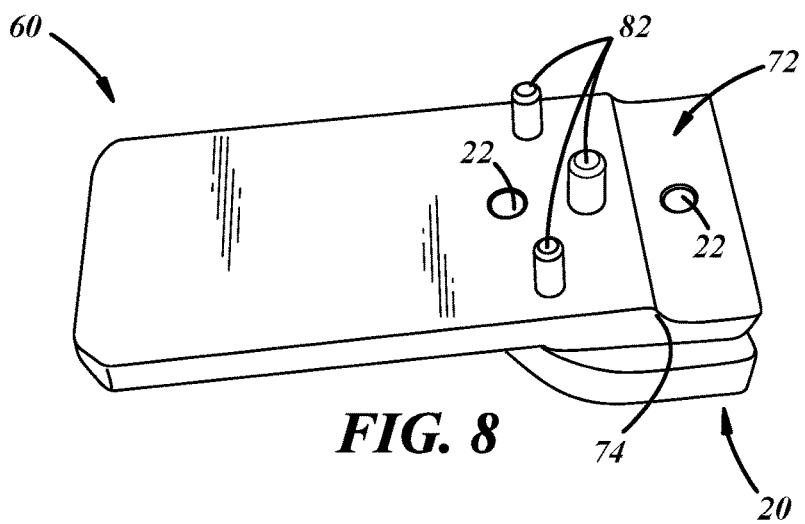
FIG. 8 depicts the illustrative adapter plate according to FIGS. 6 and 7 arranged on the accessory adapter block as shown in FIGS. 2A-2C.
Figure 9:
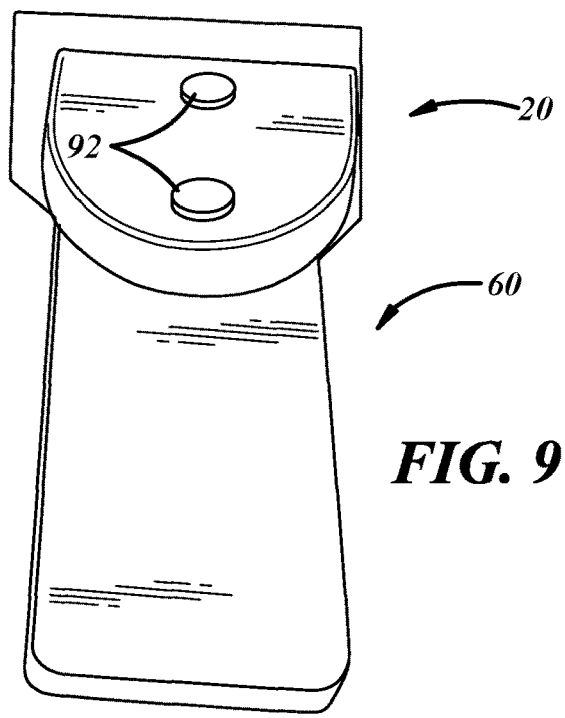
FIG. 9 illustrates an accessory adapter block and plate assembled to a tow hook.
Figure 10:
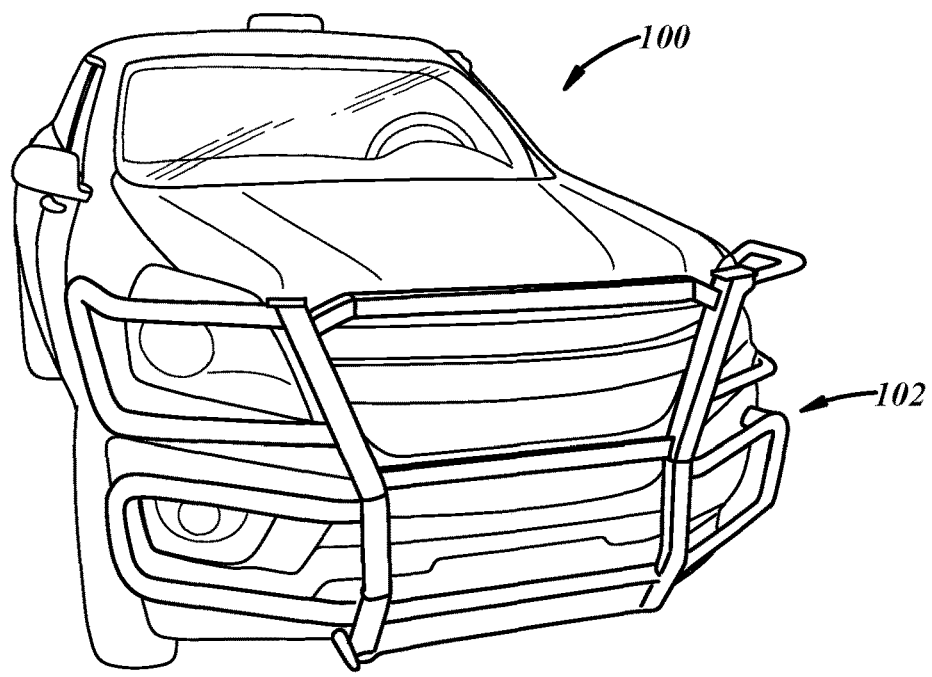
FIG. 10 depicts an illustrative brush guard attached to a vehicle using the disclosed accessory adapter block and plate assembly.

In another embodiment, the fastener 34 may comprise one or more threaded fasteners 34, and a plate 60 configured to couple the tow hook 14 within the recess 24 by placing the tow hook 14 between the accessory adapter block 20 and the plate 60. In one non-limiting embodiment, the plate 60 is constructed from steel, and as shown in FIGS. 6-8, includes a generally uniform top and bottom face having a plurality of through-holes 22, 62 extending therebetween. In some embodiments, a forward end of the plate may be stepped to include a reduced thickness at the forward end and a shoulder 74. The reduced thickness stepped portion 72 may extend about five to twenty percent of the length of the plate, including all ranges, subranges, and values therebetween. The dimensions (e.g., length, width, and height) of the plate may vary according to the application, and in particular, to the size and shape of the accessory adapter block 20 and tow hooks 14. The stepped portion 72 is sized to facilitate engagement of the plate 60 with the bed frame rail of the vehicle 10, and in particular, to ensure that the plate 60 fits securely under the frame rail. In one non-limiting embodiment, the dimensions of the plate may be 9"×4"×1". The through-holes 22, 62 are configured to receive the threaded fasteners 34 as shown in FIG. 9 to secure the accessory adapter block 20 to the tow hook 14 using the fastener plate 60. The threaded fasteners 34 may include studs, bolts, or the like and also may include threaded nuts or the like. The remaining through-holes 62 may be threaded and may be configured to receive leveling screws 82 that may be mounted to or against a bottom surface of the plate 60 as shown in FIG. 8. In some embodiments, there may be leveling screws 82 to align the accessory adapter plate 20. The leveling screws 82 may be used to adjust the position of the accessory 102 relative to the tow hook 14 and is mounted to the bumper 12 so that the accessory 102 is level and square with respect to the horizontal and vertical axes of the bumper 12. Additionally, the leveling screws 82 may be positioned such that one of the leveling screws 82 may fit into a hole 32 in the tow hook 14, such as the exemplary hole 32 illustrated in FIG. 3. In one embodiment, the accessory equipment 102 is attached, for example by welding, to the bottom face of the plate. FIG. 10 illustrates a brush guard 102 mounted to the front of a vehicle 100 using the disclosed accessory adapter block assembly.

It is to be understood that the foregoing description is not a definition of the invention, but is a description of one or more preferred illustrative embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An adapter block for mounting accessory equipment to a tow hook, the adapter block comprising:
   a top face;
   a bottom face disposed opposite the top face; and lateral sides; and
   a front side having uniform surfaces extending between the top and bottom faces, the lateral sides and the front side having a first thickness, wherein the bottom face includes a recess extending toward the top face, the recess having a second thickness less than the first thickness and being contoured to receive at least a portion of the tow hook in a mating engagement;
   wherein first and second through-passages extending between the bottom face and the top face are configured to receive a fastener that couples the tow hook within the recess.

2. The adapter block of claim 1, wherein the top face has a uniform surface substantially perpendicular to the uniform surfaces of the lateral sides and the front side.

3. The adapter block of claim 1, wherein the fastener is a plate having a plurality of through-holes configured to receive bolt fasteners to couple the tow hook in the recess.

4. The adapter block of claim 3, wherein the plurality of through-holes are further configured to receive screws for leveling the accessory equipment with respect to the tow hook.

5. The adapter block of claim 1, wherein the fastener is a U-bolt having legs extending through the first and second through-passages, and bolt fasteners coupled to the U-bolt legs.

6. The adapter of claim 1, wherein the recess is contoured to receive a tow hook having straight portions and a curved portion between the straight portions.

7. The adapter of claim 6, wherein the straight portions of the recess extend through a rear side disposed opposite the front side.

8. The adapter of claim 7, wherein the curved and straight portions of the recess define an internal boss that forms a portion of the rear side.

9. The adapter of claim 1, wherein the recess is machined to contour the size and shape of the tow hook.

10. An automobile brush guard to tow hook assembly, comprising:
    a tow hook having straight portions and a curved portion between the straight portions;
    an adapter block including:
      a first face,
      a second face oppositely disposed from the first face,
      a rear face and lateral sides extending between the first and second faces,
      a pocket in the first face having a contour corresponding to the curved and straight portions of the tow hook, wherein the pocket establishes an inboard boss partially establishing the rear face and extending within the curved and straight portions of the tow hook and an outboard boss partially establishing the lateral sides and the rear face,
      a first through-passage extending between the first and second faces and through the inboard boss, and
      a second through-passage extending between the first and second faces and through the outboard boss; and
    a fastener to fasten the adapter block to the tow hook.

11. The tow hook assembly of claim 8, wherein the pocket is machined to conform to the curved and straight portions of the tow hook.

12. The tow hook assembly of claim 8, wherein the fastener includes a U-bolt having legs extending through the first and second through passages, and fasteners coupled to the U-bolt legs.

13. The tow hook assembly of claim 8, wherein the fastener is a plate having a plurality of through-holes configured to receive bolt fasteners to couple the tow hook in the pocket.

14. The tow hook assembly of claim 13, wherein the plurality of through-holes are further configured to receive screws for leveling the accessory equipment with respect to the tow hook.

15. An adapter for mounting accessory equipment to a tow hook, the adapter comprising:
    a top face;
    a bottom face disposed opposite the top face; and
    lateral sides having straight portions extending between the top and bottom faces; and
    a curved front side extending between the lateral sides, the lateral sides and the curved front side having a first thickness, wherein the bottom face includes a recess extending toward the top face, the recess having a second thickness less than the first thickness and being contoured to receive at least a portion of the tow hook in a mating engagement;
    wherein first and second through-passages extending between the bottom face and the top face are configured to receive a fastener that couples the tow hook within the recess.

* * * * *